United States Patent   [15] 3,695,103
Olson   [45] Oct. 3, 1972

[54] CURRENT AND TURBULENCE METER
[72] Inventor: Franklyn C. W. Olson, Panama City, Fla.
[73] Assignee: The United States of America as represented by the Secretary of the Navy
[22] Filed: Sept. 23, 1970
[21] Appl. No.: 74,782

[52] U.S. Cl. .................................. 73/170 A, 73/189
[51] Int. Cl. ......................... G01p 13/00, G01w 1/00
[58] Field of Search ................ 73/170 R, 170 A, 189

[56] References Cited

UNITED STATES PATENTS

| | | |
|---|---|---|
| 2,959,052 | 11/1960 | Alexander et al. ........... 73/189 |
| 3,370,462 | 2/1968 | Bartlett et al. ................ 73/189 |
| 3,552,204 | 1/1971 | Tourmen ................. 73/170 A |
| 3,212,329 | 10/1965 | Bisberg ........................ 73/189 |
| 2,985,014 | 5/1961 | Doersam, Jr. ................ 73/189 |
| 3,365,943 | 1/1968 | Bloch ........................... 73/189 |
| 2,665,583 | 1/1954 | Anjanus ....................... 73/189 |
| 3,264,869 | 8/1966 | Erdely ......................... 73/189 |
| 3,203,236 | 8/1965 | Prince ..................... 73/170 A |

Primary Examiner—Richard C. Queisser
Assistant Examiner—Marvin Smollar
Attorney—Richard S. Sciascia, Don D. Doty and William T. Skeer

[57] ABSTRACT

The invention disclosed is an instrument for sensing, measuring, and indicating the velocity components in, the resultant velocity and direction of flow of, and turbulence occurring within a moving fluid medium. It incorporates a fluid movement responsive spherical sensor tethered by a trio of taught wires containing strain gages, one or more computers (depending on the parameters being calculated), and a readout calibrated in terms of the information desired during given operational circumstances.

9 Claims, 5 Drawing Figures

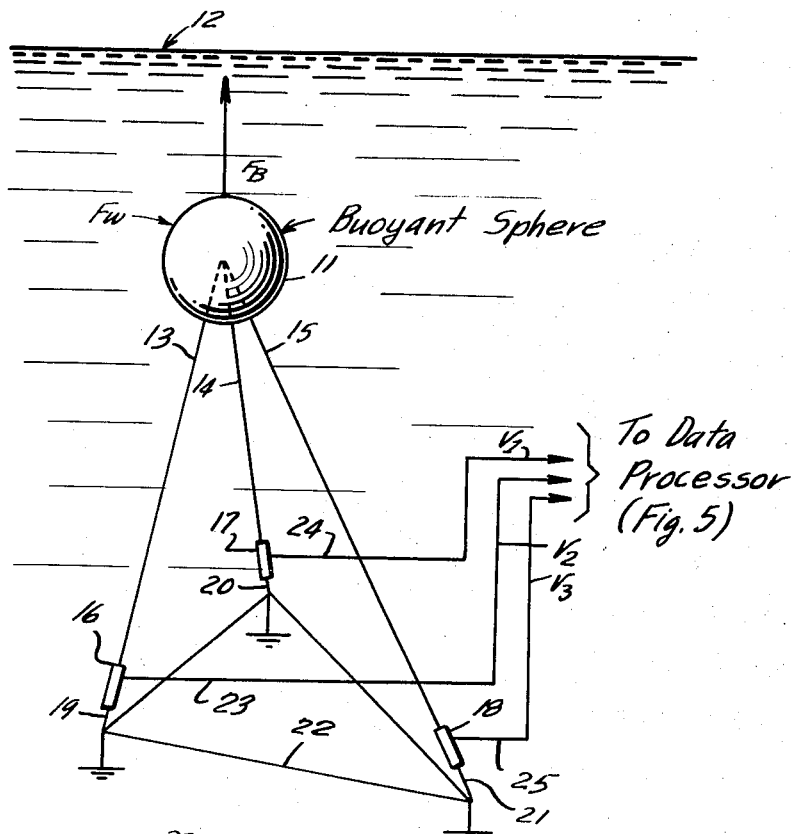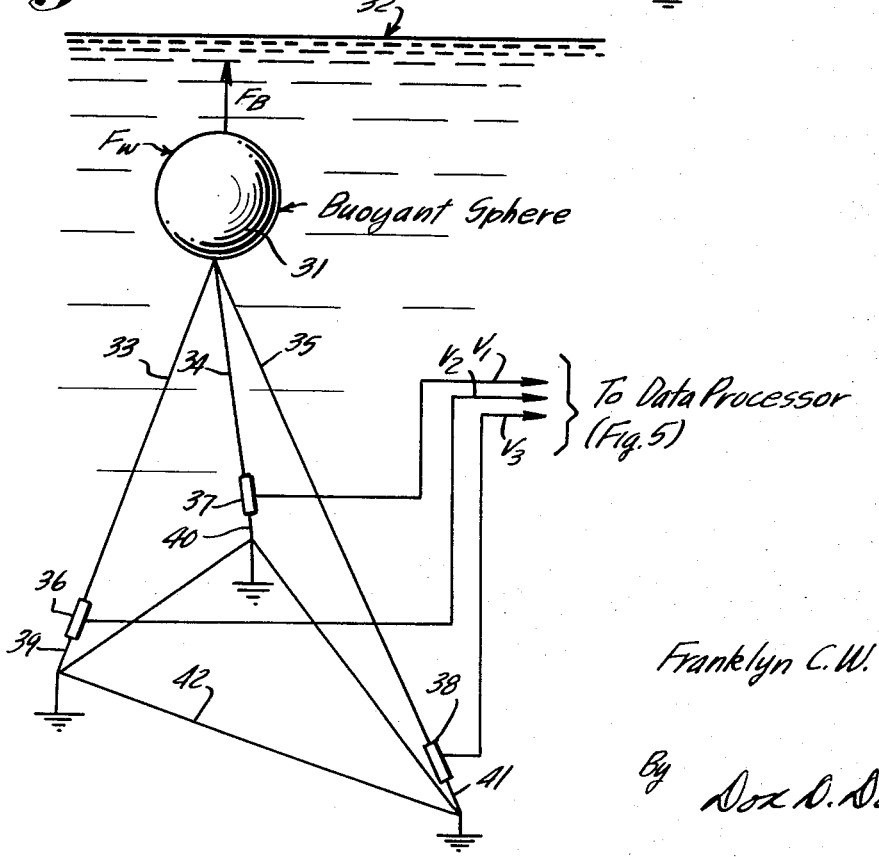

Franklyn C.W. Olson
INVENTOR

By Don D. Doty
Attorney

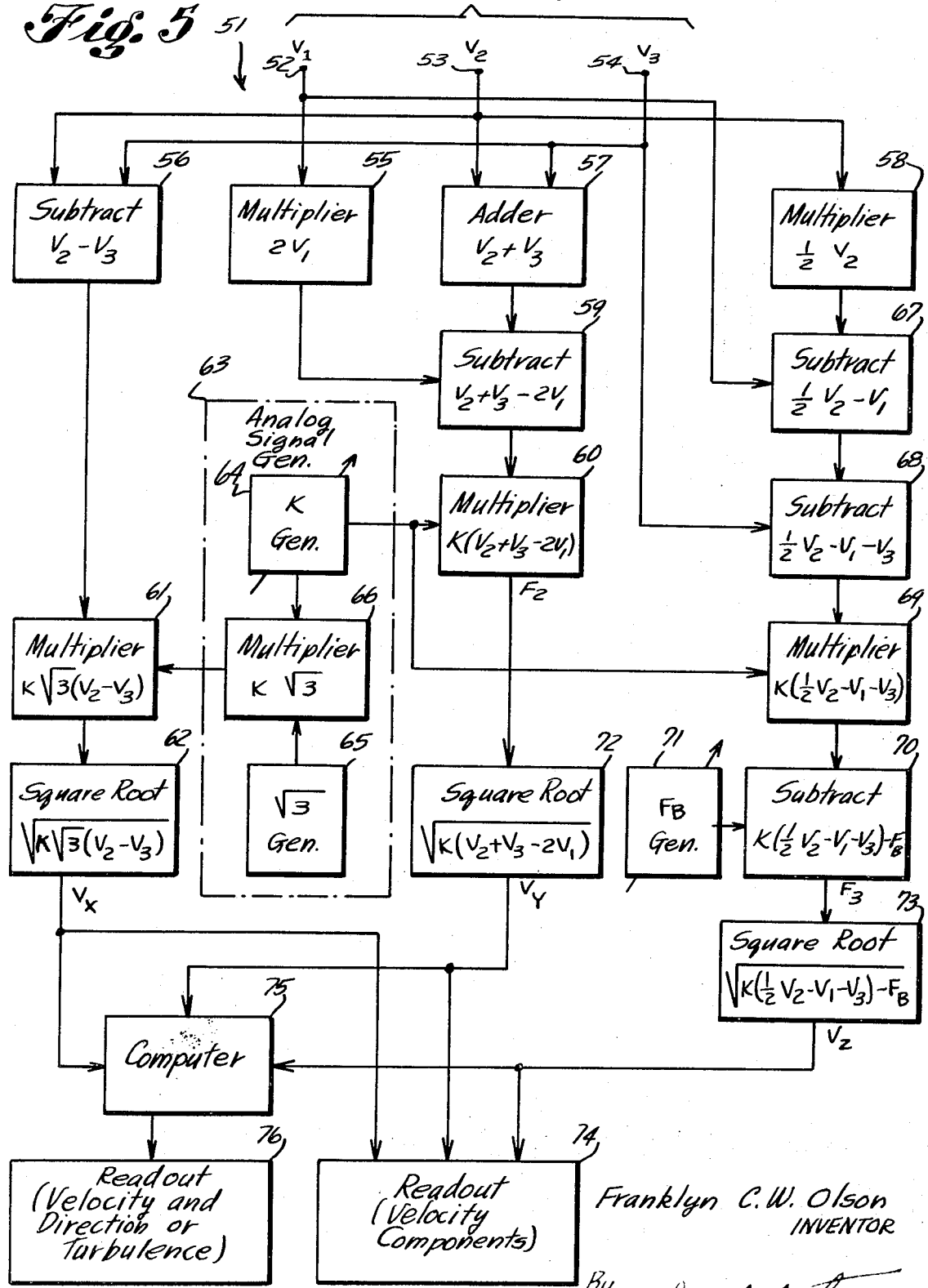

3,695,103

CURRENT AND TURBULENCE METER

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates generally to measuring and testing instruments and, in particular, is an instrument for sensing and measuring current flows and turbulence within fluids. In even greater particularity, this invention is an oceanographic instrument for sensing, measuring, and indicating velocity components, current flows, and/or turbulence in water, such as, for example, the types thereof found in pipes, rivers, lakes, bays, estuaries, seas, oceans, and the like.

At the outset, it should be understood that the instant current and turbulence meter is capable of being designed and constructed in numerous ways which will facilitate its being used in many different environmental mediums without violating the scope and spirit of the invention, and, of course, so doing would be well within the purview of one skilled in the art having the benefit of the teachings herewith presented. However, although some of said many constructions will be mentioned in somewhat greater detail subsequently, in order to keep this disclosure as simple as possible, the preferred embodiment of the invention will be described herein as being an oceanographic instrument for sensing and measuring velocity components, current flows, and turbulence in sea water.

DESCRIPTION OF THE PRIOR ART

Heretofore, such devices as ducted flow meters, hot film or wire anemometers, and rotating cup, vane, and propeller flow meters have been employed for measuring the components of current flow. Unfortunately, most thereof are insensitive due to their respective masses, the inertias of their moving parts, their constrained dispositions, and their adverse interactions with their ambient environment. For example, when ducted flow meters are used, three are required — thereby making it impossible to measure the flow components at substantially a desired point or the equivalent thereof. When hot wire or film anemometers are used, they ordinarily collect dirt, particles, or other debris that changes the resistance thereof which, in turn, reduces the sensitivity thereof. In addition, it is usually difficult, if not impossible, for such devices to distinguish between changes in current direction and changes in current velocity. Of course, rotating cups, vanes, propellers, and the like, have undesirable inertia effects which prevent them from responding rapidly to changes in current flows, especially in high velocity flows. Furthermore, because practically all of the aforesaid devices have physical characteristics which disturb the flow of the fluid medium being measured, to a considerable extent the measurements being made thereby are in error. Obviously, such errors have a deleterious effect on the sensitivity and accuracy thereof. Hence, although satisfactory for some purposes, in view of the foregoing, it may readily be seen that the various and sundry devices of the prior art sometimes leave a great deal to be desired, as far as operational results and the usefulness thereof are concerned.

SUMMARY OF THE INVENTION

The present invention overcomes many of the disadvantages of the prior art because its new and unique structure produces new and improved results not obtainable therefrom. In order to effect such results, the invention has been so constructed as to comprise a buoyant sphere that is tethered by substantially non-elastic identical wires within the fluid medium being tested for flow and/or turbulence. The other ends of said wires are connected to a trio of strain gages, respectively, which, in turn, are fastened to an object — such as, for instance, the earth's sea floor or a river bed — that is fixed or stationary relative to the flowing fluid medium being measured. Said strain gages are of the type that produces an electrical analog output signal that is proportional to the tensile force applied thereto and, hence, they effectively sense the amount of internal tension in each of said tethering wires. Of course, the tensions therein respectively vary in accordance with the fluid current and buoyancy forces continuously being applied to the aforesaid sphere by its ambient medium and, in particular, the various and sundry current flows and turbulence occurring therein.

By means of a unique computer system, the output signals from the aforesaid strain gages are converted into velocity components which are respectively proportional to the forces acting on said sphere, and, if so desired, these, in turn, are resolved to indicate the resultant velocity and direction thereof. Indications of the velocity components and/or resultant vectorial parameters may, of course, be effected by any suitable readout or readouts. In addition, by employing standard statistical procedures the aforesaid velocity components may be used to obtain the standard deviation which, in turn, is proportional to the intensity of the turbulence occurring within the medium being measured.

In view of the foregoing, it is, therefore, an object of this invention to provide an improved probe for sensing the forces occurring at and acting upon a predetermined location within a fluid medium.

Another object of this invention is to provide an improved method and means for measuring velocity components, resultant velocity and direction, and turbulence occurring at a predetermined location within a fluid medium.

Still another object of this invention is to provide flow and turbulence meter that does not disturb the flow of the fluid being measured sufficiently to adversely affect the accuracy thereof.

Another object of this invention is to provide an improved method and means for detecting, measuring, and indicating low and ultra-low flows and turbulence occurring within a fluid medium.

A further object of this invention is to provide a method and means for measuring and indicating the three orthogonal velocity components, the resultant velocity and direction of flow, and the turbulence at a predetermined region within a fluid medium that is so small as to approach a point measurement.

A further object of this invention is to provide a nonducted orthogonal component flow and turbulence meter.

Still another object of this invention is to provide a flow and turbulence meter that has a response time that is so small as to provide practically instantaneous measurements.

Another object of this invention is to provide an improved current flow and turbulence meter that, with proper design, will operate satisfactorily within any appropriate fluids — such as, for example, within water, sea water, air, gases, and any combination thereof — as well as within any suitable environment, such as within pipes or conduits, tanks, the oceans, the atmosphere, in space, and the like.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is a schematic representation of the sensor or probe portion of the invention;

FIG. 2 is a schematic representation of another embodiment of the sensor or probe portion of the invention;

FIG. 5 is a block diagram of the data processor and readout portions of the invention.

DESCRIPTION OF THE PREFERRED EMBODIMENTS

Figure 3:
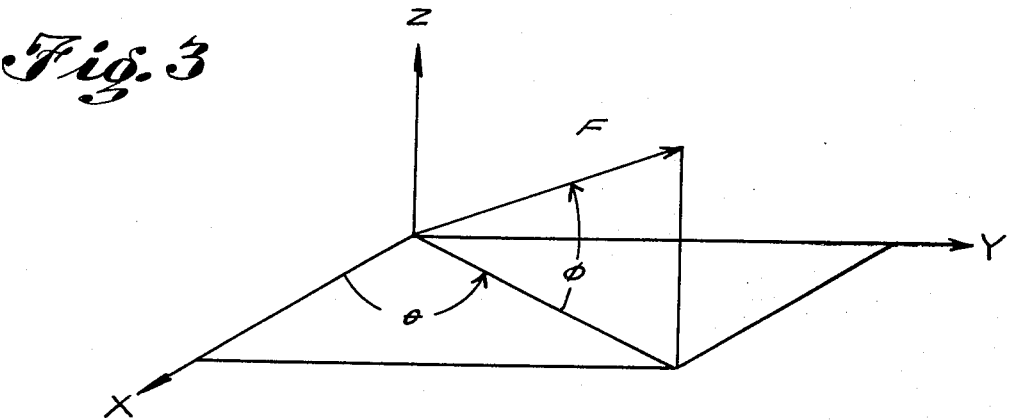
FIG. 3 is a general force diagram used in explaining the theory of the invention.

Referring now to FIG. 1, there is shown a buoyant sphere 11 which has, in this particular embodiment, an upward buoyant force $F_B$ when submerged or immersed within a fluid medium 12, the current flow and turbulence of which are to be measured. Connected to the outer surface of sphere 11 are a trio of substantially non-elastic wires 13, 14, and 15, which are connected at the other ends to a trio of strain gages 16, 17, and 18, respectively. The other ends of said strain gages 16, 17, and 18 are respectively connected by means of adjustable wires or connector links 19, 20, and 21 to any ground, base, or object 22 which is fixed relative to flowing medium 12. Of course, fixed ground, base, or object 22 may be, for instance, the sea floor, a river bed, the inside surface of a pipe or tank, or the like, or any suitable structure mounted thereon. It is noteworthy that, in this particular embodiment, the extended lower ends of wires 13, 14, and 15 are effectively connected to ground 22 at such locations that their respective upper extensions effectively meet at a point that is located at the center of sphere 11.

Electrical leads 23, 24, and 25 respectively connect the outputs of strain gates 16, 17, and 18 to the input terminals of the data processor portion of the invention illustrated in FIG. 5, which will be described subsequently.

If it is assumed for the purpose of disclosing this invention that fluid medium 12 is flowing from left to right in FIG. 1, then $F_W$ is a representation of the force of said flowing medium as it impacts upon sphere 11.

The embodiment of the invention shown in FIG. 2 is somewhat similar to that of FIG. 1. It comprises a buoyant sphere 31 of any suitable material to give it a buoyancy of $F_B$ when submerged or immersed within a fluid medium 32, the current flow and turbulence of which are to be measured. Connected at a point on the outer surface of sphere 31 are a trio of substantially non-elastic wires 33, 34, and 35, which, in turn, are respectively connected at the other ends thereof to a trio of strain gages 36, 37, and 38. The other ends of said strain gages 36, 37, and 38 are respectively connected by means of adjustable wires or connector links 39, 40, and 41 to any appropriate ground, base, or object 42 of the type or types referred to above in conjunction with the device of FIG. 1 as ground, base, or object 22. Of course, in this embodiment the effective lower extremities of wires 39, 40, and 41 may be connected at any locations on ground 42, inasmuch as the upper extremities thereof do not effectively extend to meet at the center of sphere 31. Hence, it may readily be seen that this particular embodiment of the invention facilitates its tethering wires being mounted on any terrain or place or at any angle or attitude that would otherwise present difficulties if, say, the embodiment of FIG. 1 were used.

Again, for disclosure purposes, it is assumed that fluid medium 32 is flowing from left to right in FIG. 2 and that $F_W$ is, thus, a representation of the force fluid medium 32 is applying to sphere 31 as it flows past the impacts upon it.

Although it is preferable for most practical purposes that the distances, measured along their respective tethering wires, between the buoyant spheres and grounds of each of the aforesaid embodiments be equal, it is not absolutely necessary that they be so dimensioned. However, in order to keep this disclosure as simple as possible, they will be considered herein to be equal.

As previously mentioned, all of the strain gages incorporated in the aforementioned embodiments are of the type which produce output voltages that are proportional to the respective strains occuring therein at any given instant, as a result of the tensions being applied thereto by the tethering wires. They are well known and conventional per se and, of course, are readily available commercially.

At this time, it should be understood that the subject invention may be disposed at any attitude which will facilitate the construction and mounting thereof during any given operational circumstance. For example, if so desired, the buoyant spheres may have a negative buoyancy; and in such case, the terminal points of the wires would be above the spheres, thereby making them hang in suspension within the fluid medium being measured. Obviously, it would be well within the purview of one skilled in the art having the benefit of the teachings herewith presented to design the geometrical configuration and operational attitude of the invention in such manner as would optimize the sensitivity and accuracy thereof, regardless of its ambient environment or mounting conditions. Hence, it should be considered that so doing does not violate the spirit and scope of this invention.

Because FIGS. 3 and 4 contain no physical structure — but, instead, are merely schematic force and vectorial representations — discussions with respect thereto will be deferred until the theory of operation of the invention is explained below.

Referring now to FIG. 5, there is shown a data signal processor 51 of the type that processes the output voltage signals from the aforesaid strain gages of each of the embodiments of the invention depicted in FIGS. 1 and 2, respectively, and, of course, any other embodiments thereof designed by the artisan. Hence, voltages $V_1$, $V_2$, and $V_3$ are received from the outputs of the strain gages and are respectively applied to input terminals 52, 53, and 54.

Input terminal 52 is connected to the multiplicand input of a multiplier-by-two circuit 55, which has its multiplier inherently built therein. Input terminal 53 is connected to the minuend input of a subtract circuit 56, to the augend input of an adder circuit 57, and to the multiplicand input of a multiplier-by-one-half circuit 58, the latter of which likewise has the multiplier inherently built therein. Input terminal 54 is connected to the subtrahend input of subtract circuit 56 and to the addend input of adder circuit 57.

The product output of multiplier 55 is connected to the subtrahend input of a subtract circuit 59, while the sum output of adder 57 is connected to the minuend input thereof, the difference output of which is connected to the multiplicand input of a multiplier circuit 60.

The difference output of subtract circuit 56 is connected to the multiplicand input of a multiplier circuit 61, the product output of which is connected to the radicand input of a square root circuit 62 for automatically taking the square root thereof to produce a root output voltage that is proportional to $V_X$ velocity component of the measured fluid medium.

An analog signal generator 63 comprises a variable K signal generator 64, wherein K represents a predetermined mathematical constant. Also included therein is a square root-of-three generator 65 which produces an output signal that is proportional to the mathematical term $\sqrt{3}$. The outputs of K generator 64 and square root-of-three generator 65 are respectively connected to the multiplicand and multiplier inputs of a multiplier circuit 66, the product output of which is connected to the multiplier input of the aforesaid multiplier circuit 61. The output of K generator 64 is also connected to the multiplier input of the aforesaid multiplier circuit 60.

The product output of multiplier 58 is connected to the minuend input of a subtract circuit 67, the subtrahend input of which is connected to the aforementioned input terminal 52. The difference output of subtract circuit 67 is connected to the minuend input of another subtract circuit 68, the subtrahend input of which is connected to the aforesaid input terminal 54. The difference output of subtract circuit 68 is connected to multiplicand input of a multiplier circuit 69, while the multiplier input thereof is connected to the output of the aforesaid K generator 64. The product output of multiplier 69 is connected to the minuend input of a subtract circuit 70, the subtrahend input of which is connected to the output of a variable $F_B$ generator 71, which, of course, generates a constant output voltage signal that represents the positive or negative buoyancy of the aforesaid sphere 11, as the case may be.

The product output of the aforesaid multiplier circuit 60 is connected to the radicand input of a square root circuit 72, and the difference output of said subtract circuit 70 is connected to the radicand input of another square root circuit 73. Of course, the root outputs of square root circuits 72 and 73 have voltages which are respectively proportional to the $V_Y$ and $V_Z$ velocity components of the fluid medium being measured.

In some instances, the aforesaid $V_X$, $V_Y$, and $V_Z$ velocity component voltages may be of significance per se; hence, it may be desirable to read them out individually by means of any suitable readout 74 that is calibrated for such purpose. But on some occasions, they may also be read out in other terms, if so doing would be more advantageous or expeditious for the particular circumstances involved. The proper selection of readout in such case would, of course, only be a matter of design choice, the making of which would be obvious to the artisan. In any event, the root outputs of square root circuits 62, 72, and 73 are connected to appropriate inputs of readout 74 for such purpose.

In other instances, the aforesaid $V_X$, $V_Y$, and $V_Z$ velocity component voltages may be further processed to calculate such parameters as resultant velocity and direction, turbulence, and the like. In such case, the root outputs of square root circuits 62, 72, and 73 are connected to a computer 75 of such design that will perform the conventional mathematical functions involved. Several of the commercially available computers, such as, for example, the Burroughs-5500 or the IBM-360, may be employed for such purpose or purposes. The output of computer 75 is, in turn, connected to the input of any suitable readout 76 incorporated therein or connected thereto which has been calibrated in terms of fluid flow resultant velocity and direction and/or statistical turbulence.

Depending on the intended purpose of the invention during any given operational circumstance, either or both of readouts 74 and 76 may be employed. Moreover, if so desired, they may be combined to be single readout, in the event so doing would be the more expedition way of handling the situation.

At this time, it would perhaps be noteworthy that all of the elements and components included in this invention, and especially those disclosed in block diagram form, are well known and conventional per se. It is, therefore, to be understood that it is their unique interconnections and interactions which constitute the new combination thereof that causes the new and improved results to be effected thereby.

THEORY OF OPERATION

In order to insure that it is understood that the subject invention functions in accordance with the disclosure thereof presented above, the theory of operation thereof is herewith defined mathematically in conjunction with the embodiments of FIGS. 1 and 2 as follows:

The invention basically consists of a buoyant sphere secured by three somewhat taught wires containing strain gages and a unique calculator for processing the respective strain signals emanating therefrom due to the various fluid forces acting against said sphere. Although, as previously mentioned, any fluid may be measured, for simplicity of disclosure in this instance, the measured fluid will be considered as being water.

Letting $F_B$ be the upward buoyant force of the sphere and $F_W$ be the force of the water thereagainst, the resultant force F is
$$\vec{F} = \vec{F}_B + \vec{F}_W. \tag{1}$$
Then, letting $\vec{i}, \vec{j},$ and $\vec{k}$ be unit vectors,
$$\vec{F} = \vec{i}F_1 + \vec{j}F_2 + \vec{k}F_3. \tag{2}$$
Referring now to FIG. 3, where O represents the center of the sphere, and X, Y, and Z orthogonal axes with respect thereto, and F the resultant water force,
$$F_1 = F \sin\phi \cos\theta \tag{3}$$
$$F_2 = F \sin\phi \sin\theta \tag{4}$$
$$F_3 = F \sin\phi \tag{5}$$
where $\theta$ is the angular distance to F from axis X and $\phi$ is the vertical angular distance from the plane through axes X and Y.

Figure 4:
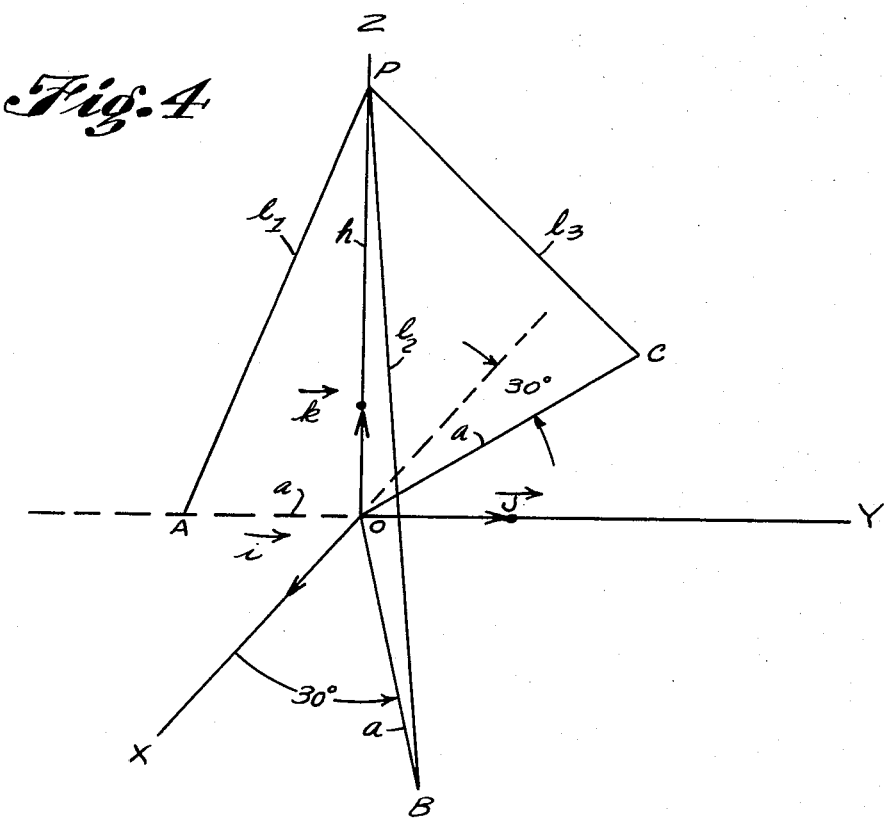
FIG. 4 is a representative force diagram which is intended to be specific to a representative geometrical configuration of the invention and which is also used in explaining the theory of operation of the invention.

If it is assumed that the tethering or securing strain gage wires are equal in length, attached at equal distances from a zero reference point on X-Y-Z axes, and constitute vectors, it may be seen from FIG. 4 that
$$\vec{l}_1 = 0 - \vec{j}a - \vec{k}h \tag{6}$$
$$\vec{l}_2 = \vec{i}\frac{\sqrt{3}}{2}a + \vec{j}\frac{1}{2}a - \vec{k}h \tag{7}$$
$$\vec{l}_3 = -\vec{i}\frac{\sqrt{3}}{2}a + \vec{j}\frac{1}{2}a - \vec{k}h \tag{8}$$
wherein
$\vec{i}$ = a unit vector in the X direction,
$\vec{j}$ = a unit vector in the Y direction,
$\vec{k}$ = a unit vector in the Z direction,
$a$ = the distance from the 0 axis to the point of attachment of each strain gage wire.

Then the tensions in the respective wires are given by
$$T_1 = \vec{F} \cdot \vec{l}_1 \tag{9}$$
$$T_2 = \vec{F} \cdot \vec{l}_2 \tag{10}$$
$$T_3 = \vec{F} \cdot \vec{l}_3 \tag{11}$$
or
$$T_1 = -aF_2 - hF_3 \tag{12}$$
$$T_2 = \frac{\sqrt{3}}{2}aF_1 + \frac{1}{2}aF_2 - hF_3 \tag{13}$$
$$T_3 = -\frac{\sqrt{3}}{2}aF_1 + \frac{1}{2}aF_2 - hF_3 \tag{14}$$

The determinant of Equations (12), (13), and (14) is:
$$\Delta = \begin{vmatrix} 0 & -a & -h \\ \frac{\sqrt{3}}{2}a & \frac{1}{2}a & -h \\ -\frac{\sqrt{3}}{2}a & \frac{1}{2}a & -h \end{vmatrix} = \frac{\sqrt{3}}{2}a^2h \begin{vmatrix} 0 & -1 & -1 \\ 1 & \frac{1}{2} & -1 \\ -1 & \frac{1}{2} & -1 \end{vmatrix}$$
$$= \frac{\sqrt{3}}{2}a^2h\left(-1 - \frac{1}{2} - \frac{1}{2} - 1\right) = -\frac{3\sqrt{3}}{2}a^2h \tag{15}$$
and
$$F_1 = \frac{1}{\Delta}\begin{vmatrix} T_1 & -a & -h \\ T_2 & \frac{1}{2}a & -h \\ T_3 & \frac{1}{2}a & -h \end{vmatrix} = \frac{1}{\Delta}\left(-\frac{1}{2}ahT_1 + ahT_3 - \frac{1}{2}ahT_2 + \frac{1}{2}ahT_3 + \frac{1}{2}ahT_1 - ahT_2\right)$$

$$F_1 = \frac{1}{\Delta}ah\left(-\frac{3}{2}T_2 + \frac{3}{2}T_3\right) = \frac{\frac{3}{2}ah(-T_2 + T_3)}{-\frac{3\sqrt{3}}{2}a^2h} \tag{16}$$

$$F_1 = \frac{T_2 - T_3}{\sqrt{3}a}, \tag{17}$$

$$F_2 = \frac{\frac{\sqrt{3}ah}{2}}{\Delta}\begin{vmatrix} 0 & T_1 & -1 \\ 1 & T_2 & -1 \\ -1 & T_3 & -1 \end{vmatrix} = \frac{\sqrt{3}ah}{-2 \cdot \frac{3\sqrt{3}}{2}a^2h}(T_1 - T_3 - T_2 + T_1)$$

$$F_2 = \frac{1}{3a}(T_2 + T_3 - 2T_1) \tag{18}$$

$$F_3 = \frac{-h \cdot \frac{\sqrt{3}a}{2}}{\Delta}\begin{vmatrix} 0 & -1 & T_1 \\ 1 & \frac{1}{2} & T_2 \\ -1 & \frac{1}{2} & T_3 \end{vmatrix} = \frac{-\frac{\sqrt{3}ad}{2}}{3\frac{\sqrt{3}a^2h}{2}}\left(-\frac{1}{2}T_2 + \frac{1}{2}T_1 + \frac{1}{2}T_1 + T_3\right)$$

$$F_3 = \frac{1}{3a}\left(\frac{1}{2}T_2 - T_1 - T_3\right) \tag{19}$$

Therefore, $F_1$, $F_2$, and $F_3$ are expressed in terms of measured quantities and may now be presumed to be known. Then, from Equations (3), (4), and (5)
$$F_2/F_1 = \tan\theta \text{ or} \tag{20}$$
$$\theta = \arctan(F_2/F_1) \tag{21}$$
and
$$\sin\phi = F_3/F = \frac{F_3}{\sqrt{F_1^2 + F_2^2 + F_3^2}} \tag{22}$$
$$\phi = \arcsin\frac{F_3}{F}. \tag{23}$$

Thus, $\theta$ and $\phi$ become known. But what is really wanted is the components of $\vec{F}_W$. Since $\vec{F}_B = \vec{k}F_B$, and $F_B$ is known
$$\vec{F}_W = \vec{i}F_{W1} + \vec{j}F_{W2} + \vec{k}F_{W3} = \vec{F} - \vec{F}_B = \vec{i}F_1 + \vec{j}F_2 + \vec{k}F_3 - \vec{k}F_B \tag{24}$$
and
$$F_{W1} = F_1 \tag{25}$$
$$F_{W2} = F_2 \tag{26}$$
$$F_{W3} = F_3 - F_B. \tag{27}$$

In any practical application, it is likely that the device constituting this invention will be calibrated either in a flume or a tow tank. Under such circumstances, the outputs of the strain gages will be voltages that are respectively proportional to $T_1$, $T_2$, and $T_3$, the respective tensions in the three strain gage wires. Letting these be written as $$V_1 = k_1 T_1 \quad (28)$$

$$V_2 = k_1 T_2 \quad (29)$$

$$V_3 = k_1 T_3, \quad (30)$$

where $k_1$ is equal to equal unit vectors in the X, Y, and Z directions, respectively, then Equations (17), (18), and (19) can be written $$F_1 = \sqrt{3} k (V_2 - V_3) \quad (31)$$

$$F_2 = k (V_2 + V_3 - 2V_1) \quad (32)$$

$$F_3 = k \left(\frac{1}{2} V_2 - V_1 - V_3\right) \quad (33)$$

where $$k = \frac{1}{3ak_1}. \quad (34)$$

So far the $F_1$, $F_2$, and $F_3$ outputs of Equations (31), (32), and (33) are proportional to the respective orthogonal forces on buoyant sphere 11. However, to be more useful, they are preferably converted to their corresponding velocities. Therefore, since over a given range the aforesaid forces are proportional to the square of their respective velocities, said velocities may be obtained by taking the square root of each of the values thereof as follows:

$$V_X = \sqrt{F_1} = \sqrt{\sqrt{3} k (V_2 - V_3)} \quad (35)$$

$$V_Y = \sqrt{F_2} = \sqrt{k(V_2 + V_3 - 2V_1)} \quad (36)$$

$$V_Z = \sqrt{F_3} = \sqrt{K \left(\frac{1}{2} V_2 - V_1 - V_3\right)} \quad (37)$$

where $V_X$ = the velocity component of the fluid medium in the X direction, $V_Y$ = the velocity component of the fluid medium in the Y direction, $V_Z$ = the velocity component of the fluid medium in the Z direction.

These velocity component values are, of course, the ones that are indicated by readout 74. In addition, where further processed by any suitable conventional computer 75, they may be used as the parameters from which to calculate the resultant vector — that is, the resultant velocity and direction of flow of the water of other fluid medium — and/or to make a statistical analysis to obtain the previously mentioned standard deviation, thereby effecting an indication of the turbulence occurring within the fluid medium at the location of sphere 11. Either or both thereof may, of course, be indicated and/or recorded by any appropriately designed and calibrated readout 76, as will be mentioned further subsequently during the explanation of the actual operation of the invention.

At this time, it would perhaps be pertinent from a theoretical standpoint to make a distinction between velocity and turbulence within fluid mediums, either or both of which are parameters capable of being detected and measured by the subject instrument. It may be said that in a flowing fluid, at any given instant, said fluid has a particular velocity in some direction. For example, in laminar flow, ordinarily the flow velocities of the particular molecules of the fluid are flowing substantially in the same direction at any given instant. Thus, such flow is ordinarily defined as not being turbulent. On the other hand when there happens to be a random flow of molecules within a fluid medium (wherein the direction of flow velocities are also random) by definition it is ordinarily said that turbulence (or possibly cavitation) exists therein. Of course, such characteristics of both turbulent and nonturbulent or laminar flows are well defined in the fluid mechanics art and in many dictionaries, as well. In view of the availability of such definitions, it would ostensively be well within the purview of one skilled in the art to make the distinctions between laminar and turbulent flow for the purpose of taking measurements of either thereof, and especially for taking measurements of laminar flow without excessive difficulty. Obviously, the accuracy at which measurements of such laminar flow is accomplished depends upon the sensitivity and accuracy of the measuring instrument involved, and this is, of course, especially true when attempting to measure low or ultra-low flows.

With respect to turbulence, as previously indicated, the employing of standard statistical procedures regarding velocity components occurring within a flowing fluid may be used to calculate the "standard deviation," which, in turn, is proportional to the intensity of the turbulence occurring within the medium being measured at any particular instant. As evidence of the significance of such statistical procedures, reference is made to the Encyclopedia of Oceanography, edited by Rhodes W. Fairbridge, dated 1966, in which a discussion of the statistical properties of turbulence is presented. In addition, in the book entitled The Mechanics of Fluids, by Duncan, Thom, and Young, dated 1960, it is stated that the mean intensities of the turbulent velocity components within a fluid medium are conventionally represented by their root mean squares, viz:

$$\sqrt{(\overline{U_1})^2}, \sqrt{(\overline{V_1})^2}, \sqrt{(\overline{W_1})^2},$$

and the overall turbulence is represented by the expression $$\frac{1}{2} \left[\sqrt{(\overline{U_1})^2} + \sqrt{(\overline{V_1})^2} + \sqrt{(\overline{W_1})^2}\right] \quad (38)$$

where $U_1$, $V_1$, and $W_1$, are fluid velocities in three orthogonal directions. Of course, using just the first term of expression (38) as an example — that is, the term $(\overline{U_1})^2$ — it is well known that the standard deviation $(\overline{U_1})^2$ may be statistically calculated by a conventional computer (such as, for instance, computer 75 of FIG. 5) from the equation $$(\overline{U_1})^2 = \frac{1}{N} [(\overline{U} - U_1)^2 + (\overline{U} - U_2)^2 +] \quad (39)$$

where N is the number of $(\overline{U} - U)$ terms involved.

Thus, it may readily be seen that a theoretical computation of the aforementioned standard deviation may be obtained through statistical mathematical processes which, in turn, tend to define the statistical properties of turbulence within a fluid medium. In other words, by employing standard statistical procedures the previously mentioned velocity components of any given fluid may be used to obtain the standard deviation, a parameter that is proportional to turbulence in a fluid medium.

MODE OF OPERATION

The operation of the invention will now be discussed briefly in conjunction with FIGS. 1, 2, and 5 of the drawing.

At the outset, it is ordinarily necessary to calibrate the invention, and especially the probe or sensor portion thereof. As previously suggested, so doing may be expedited by using a flume, tow tank, or other test chamber designed therefor. Initially, the sensor — as exemplarily depicted in FIGS. 1 and 2 but not limited thereto — is placed in still water with a structural configuration and disposition such that the strain gage wires are of equal length and connected to a suitable mounting base or ground at equal distances apart, thereby forming an equilateral triangle between ground connectors. The tension on the wires should then be effectively adjusted by mechanically adjusting the length thereof by turn buckles (not shown) or by their respective adjustable connections with the strain gages, so as to cause the voltage output signals from said strain gages to be equal as a zero setting. At that time $V_1 = V_2 = V_3$ and $F_1 = F_2 = 0$, as may be inferred from inspection of the aforementioned Equations (25), (26), and (27). Because output $F_3$ will then equal the buoyant force on the sphere, a bias is applied by means of $F_B$ generator 71 which effectively reduces it to zero, too. (See Equation (27)). When so set up, various known fluid flows may be made to occur within the test chamber, and the readouts adjusted to correspond thereto.

An actual measuring installation of the subject invention is or preferably should be similar to that used during calibration, so as to obtain optimum accuracy. Once installed, the fluid medium — in this representative case, the water — will flow past the buoyant sphere, and while doing so will impact thereon from component directions that are proportional to the resultant flow and internal turbulence thereof. Accordingly, the three tethering wires will be tensioned in such manner as to correspond to such impact and thereby apply stress to their respective strain gages. Said strain gages will, in turn, produce output voltages $V_1$, $V_2$, $V_3$, which are respectively proportional to said stresses, and these are the signals that are applied to input terminals 52, 53, and 54 of the calculator disclosed in FIG. 5.

It may be noteworthy, incidentally, that because the trio of tethering wires of the subject instrument are usually made of similar material (usually metal, such as, for example, iron, stainless steel, copper, aluminum, or the like, but, if desired, may be nylon, plastic, rope, or any other suitable material), they are similarly effected by temperature changes occurring in the fluid medium contiguous therewith either during calibration or during actual use — and, hence, their respective dimensions are usually not changed enough relative to one another to have a deleterious effect upon the accuracy thereof. But even if they were — say, for the reasons that one is longer than the other, that the temperature ambient to one happens to be a little different than the temperature ambient to the others, or that the ambient temperature of one or more varies along the length thereof — automatic dimension adjustment occurs within the entire pyramidal sensor support assembly configuration, which results in automatic temperature compensation. This is true, since the resultant thereof is a tethering force that is applied to the freely movable sensor sphere in opposition to its predetermined innate directional buoyancy force. Thus, it may readily be seen that movement thereof to maintain an operative, appropriately tethered, geometrical configuration occurs easily and automatically, and, consequently, it may be said that the subject invention is continuously temperature-self-compensating.

Rather than belabor the disclosure of the various and sundry operations performed by calculator 51, suffice to say that, in general, it performs the mathematical function defined in each of the blocks thereof by means of the circuitry indicated therefor, respectively, and that so performing such operations and functions would be obvious to anyone skilled in the art inspecting and following through said FIG. 5. However, it would appear to be of some specific significance that the outputs of multipliers 61 and 60 and subtract circuit 70 constitute analog voltages which are respectively proportional to the aforesaid forces $F_1$, $F_2$, and $F_3$, and that the outputs of square root circuits 62, 72, and 73 are analog voltages which are respectively proportional to the aforementioned velocities $V_X$, $V_Y$, and $V_Z$ of the water (or other fluid) being sensed and measured. Of course, as previously indicated, the latter may be read out as velocity components and/or further processed to compute and read out velocity vectors and turbulence.

From the foregoing, it may readily be seen that, in spite of its simplicity, this invention performs in such manner that the response time thereof is practically instantaneous and with an accuracy that is not adversely affected to any unreasonable extent by itself disturbing the flow of the medium it is intended to measure. Therefore, it obviously produces improved results not obtainable from the devices of the prior art.

As previously suggested, the probe or sensor portions of the invention are not limited to the preferred embodiments illustrated schematically in FIGS. 1 and 2. For example, the probes may be mounted upside down with the sphere thereof having negative buoyancy and thereby acting as a weight when suspended from terminal points located above it. Furthermore, if so desired, it may be disposed in a gas, such as air or the like, and in such instance, the buoyant sphere may take the form of a balloon or other type of floating member having positive buoyancy characteristics.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A highly sensitive, substantially temperature-self-compensating instrument for accurately detecting and measuring the flow components of currents and turbulence of a moving fluid within a predetermined range thereof, comprising in combination:

sensor means having a predetermined innate directional buoyancy force relative to said fluid for response to the movements thereof ambient thereto when immersed therein;

support means having, in effect, a triangular configuration spatially disposed from said sensor means and fixed relative to said moving fluid;

a trio of substantially straight non-elastic wire tethering means respectively connected between the vertices of said fixed effectively triangularly configured support means and said sensor means for applying a resultant tethering force thereto that is effectively equal and opposite to the aforesaid predetermined innate directional buoyancy force thereof for the securing thereof in a predetermined disposition within a predetermined geometrical configuration within said moving fluid; and a trio of strain sensing means connected to and effectively incorporated in said trio of substantially straight non-elastic wire tethering means for continuously producing a trio of output signals that are proportional to the tensions occurring therein, respectively.

2. The device of claim 1 wherein said sensor means having a predetermined innate directional buoyancy force relative to said fluid for response to the movements thereof ambient thereto when immersed therein comprises a spherical float having a positive buoyancy, and wherein said support means having, in effect, a triangular configuration spatially disposed from said sensor means and fixed relative to said moving fluid is located below said sensor means.

3. The device of claim 1 wherein said sensor means having a predetermined innate directional buoyancy force relative to said fluid for response to the movements thereof ambient thereto when immersed therein comprises a spherical weight having a negative buoyancy, and wherein said support means having, in effect, a triangular configuration spatially disposed from said sensor means and fixed relative to said moving fluid is located above said sensor means.

4. The invention of claim 1 wherein each of said trio of strain sensing means connected to and effectively incorporated in said trio of substantially straight non-elastic wire tethering means for continuously producing a trio of output signals that are proportional to the tensions occurring therein, respectively, comprises a strain gauge.

5. The invention of claim 1 further characterized by means connected to the outputs of said trio of strain sensing means for converting the trio of output signals therefrom into another trio of signals that are respectively proportional to velocity components occurring within said moving fluid.

6. The invention of claim 1 further characterized by:
means connected to the outputs of said trio of strain sensing means for converting the trio of output signals therefrom into another trio of signals that are respectively proportional to velocity components occurring within said moving fluid; and means connected to the outputs of said converting means for reading out said another trio of signals in terms of the aforesaid velocity components.

7. The invention of claim 1 further characterized by:
means connected to the outputs of said trio of strain sensing means for converting the trio of output signals therefrom into another trio of signals that are respectively proportional to velocity components occurring within said moving fluid; and computer means connected to the outputs of said converting means for calculating the resultant velocity and direction of flow of said moving fluid and the turbulence occurring therein in response to said another trio of signals that are proportional to velocity components occurring within said moving fluid.

8. The invention of claim 1 further characterized by:
means connected to the outputs of said trio of strain sensing means for converting the trio of output signals therefrom into another like trio of signals that are respectively proportional to velocity components occurring within said moving fluid;

computer means connected to the outputs of said converting means for calculating the resultant velocity and direction of flow of said moving fluid and the turbulence occurring therein in response to said another trio of signals that are proportional to velocity components occurring within said moving fluid; and means connected to the outputs of said computer means for reading out the resultant velocity and direction of flow of said moving fluid and the turbulence occurring therein.

9. The invention of claim 1 further characterized by:
means connected to the outputs of said trio of strain sensing means for converting the trio of output signals therefrom into another trio of signals that are respectively proportional to velocity components occurring within said moving fluid;

computer means connected to the outputs of said converting means for calculating the resultant velocity and direction of flow of said moving fluid and the turbulence occurring therein in response to said another trio of signals that are proportional to velocity components occurring within said moving fluid; and means connected to the outputs of said computer means and the outputs of the aforesaid converting means for reading out the resultant velocity and direction of flow of said moving fluid and the turbulence and velocity components occurring therein.

* * * * *